Oct. 7, 1924.
E. J. SWEETLAND
FILTER
Original Filed Feb. 2, 1917  6 Sheets-Sheet 2
1,510,568
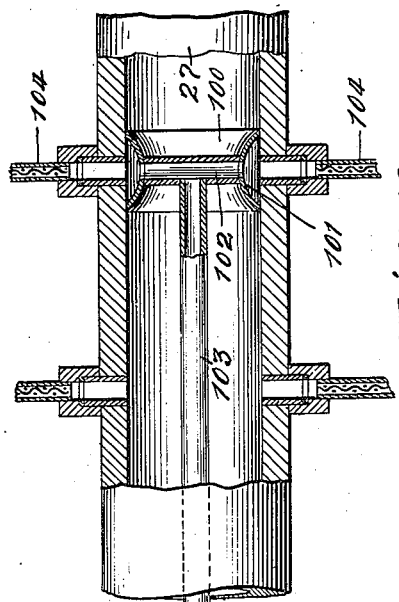
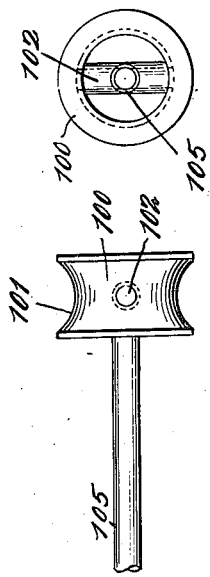
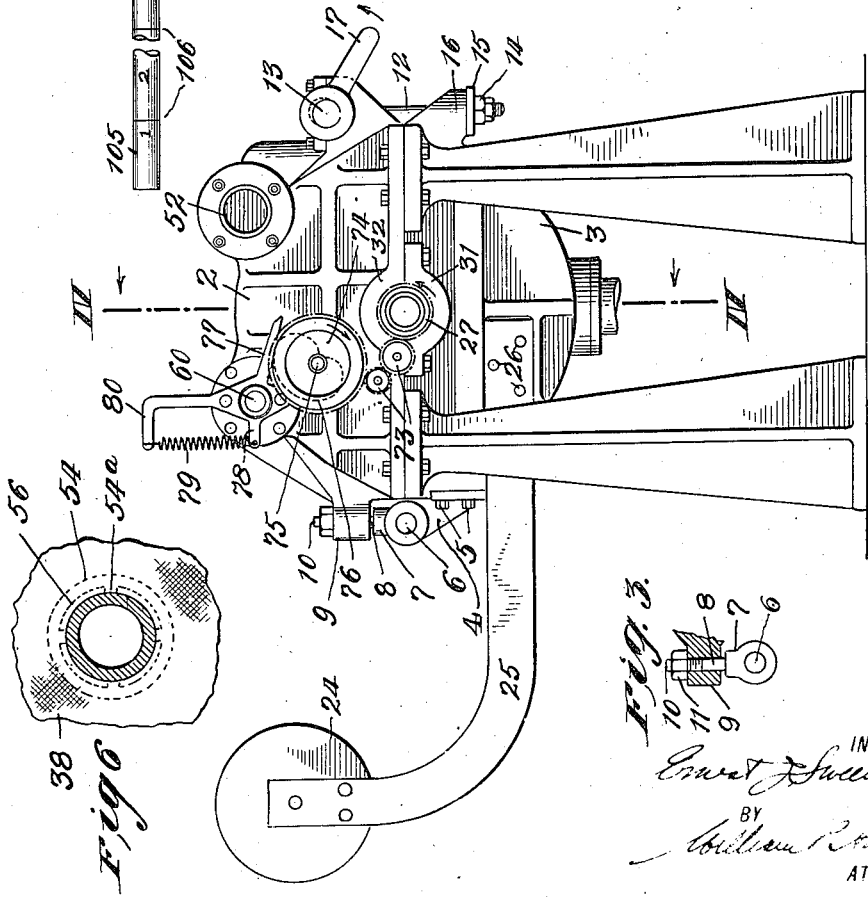
INVENTOR
BY
ATTORNEY

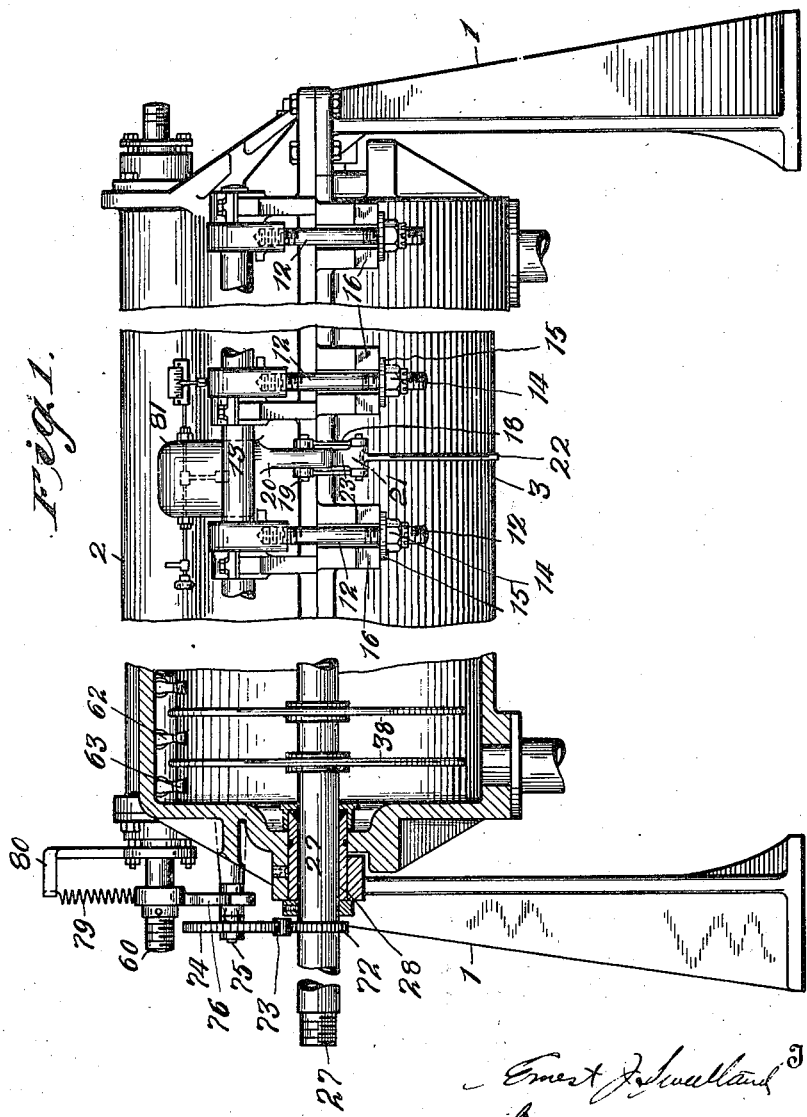

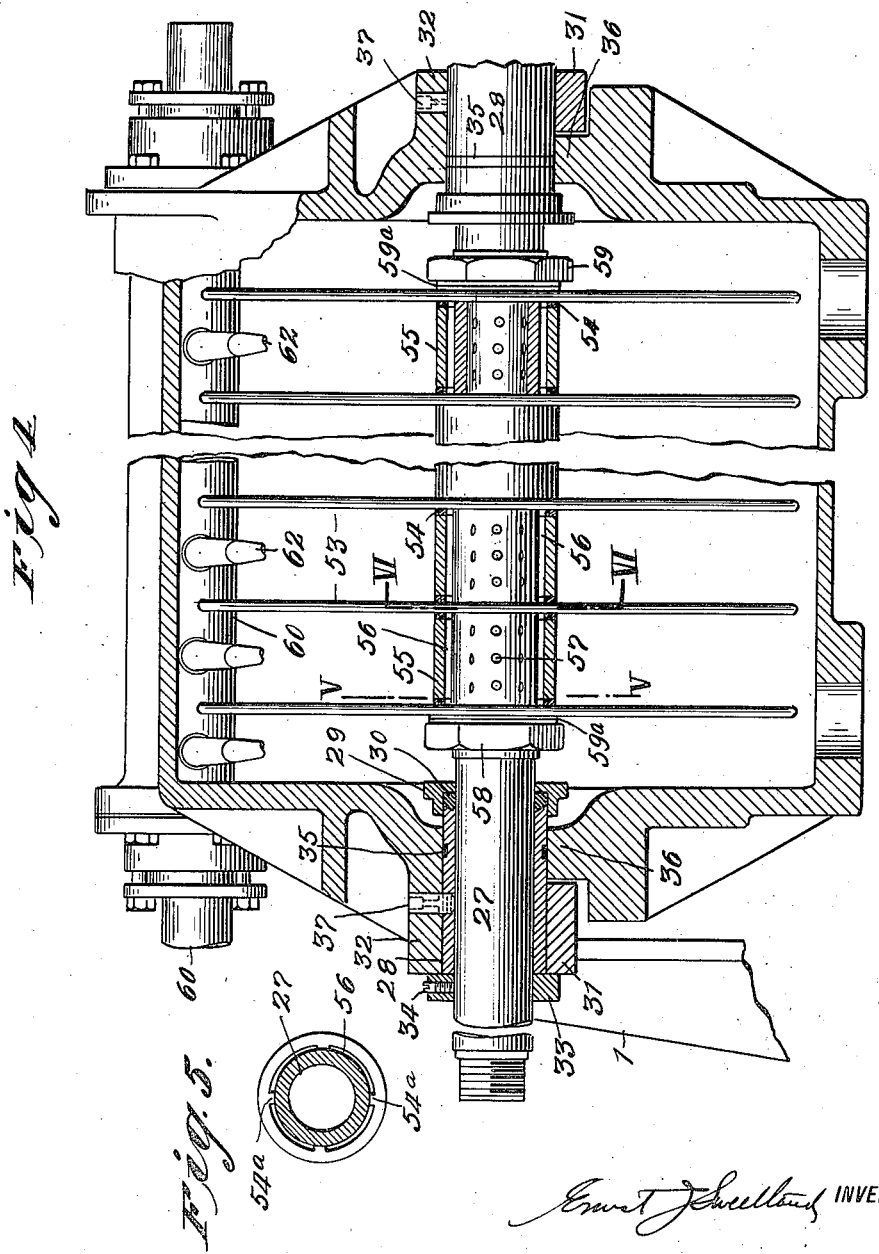

Oct. 7, 1924.                                              1,510,568
                    E. J. SWEETLAND
                         FILTER
           Original Filed Feb. 2, 1917    6 Sheets-Sheet 4
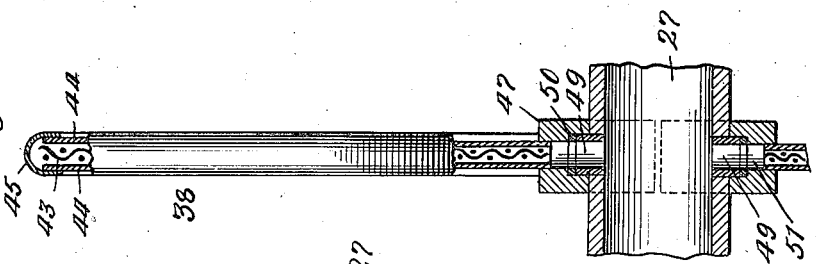
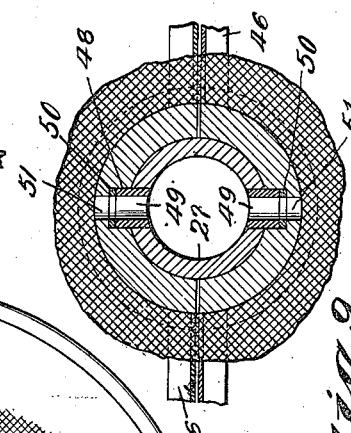
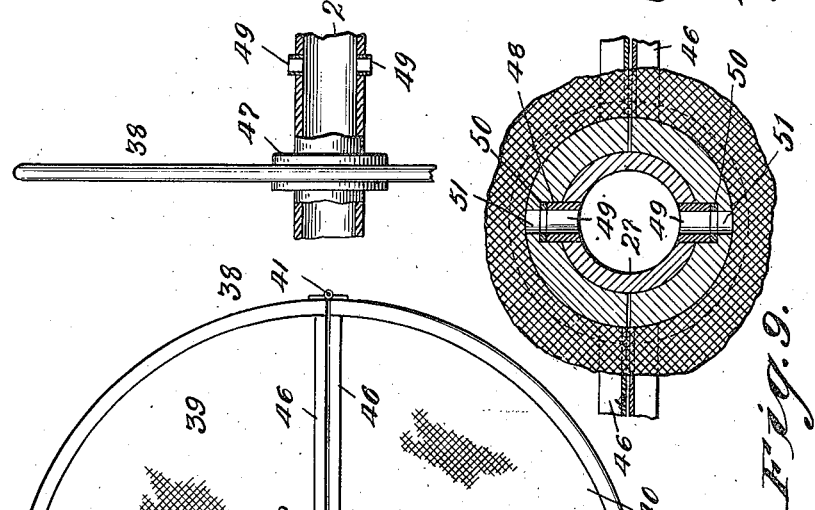
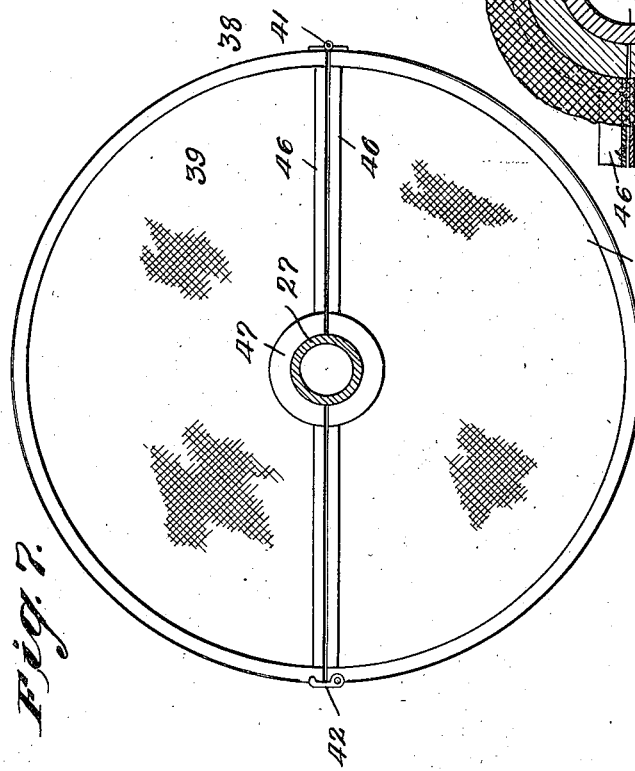
INVENTOR
Ernest J. Sweetland
BY
William P. Hammond
ATTORNEY Oct. 7, 1924.
E. J. SWEETLAND
FILTER
Original Filed Feb. 2, 1917    6 Sheets-Sheet 5
1,510,568
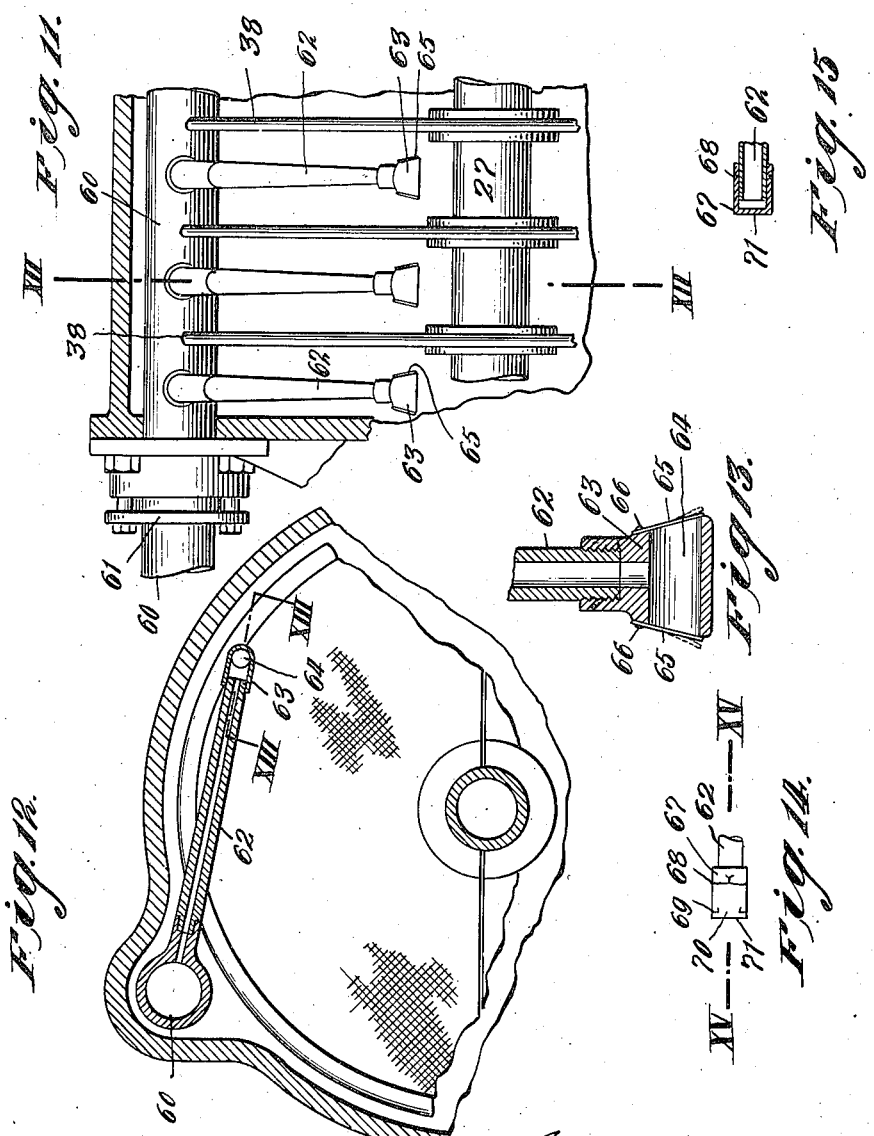

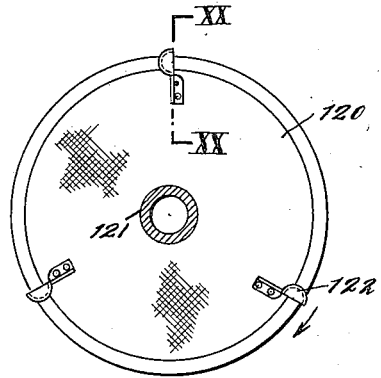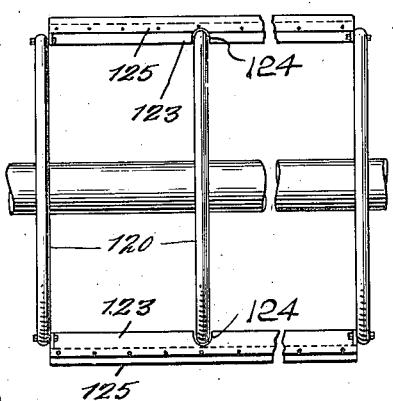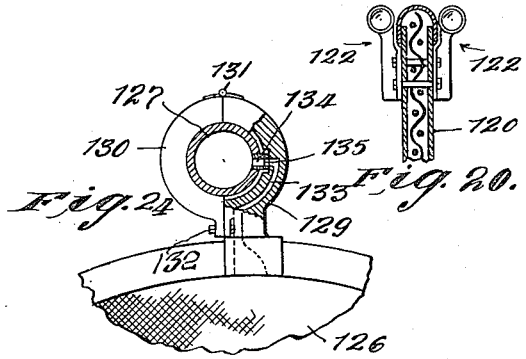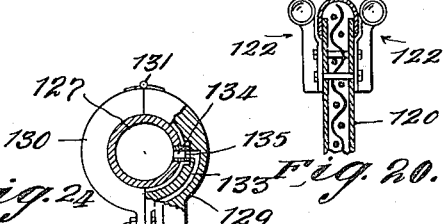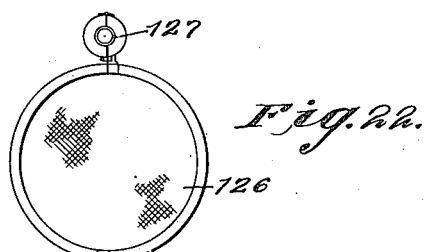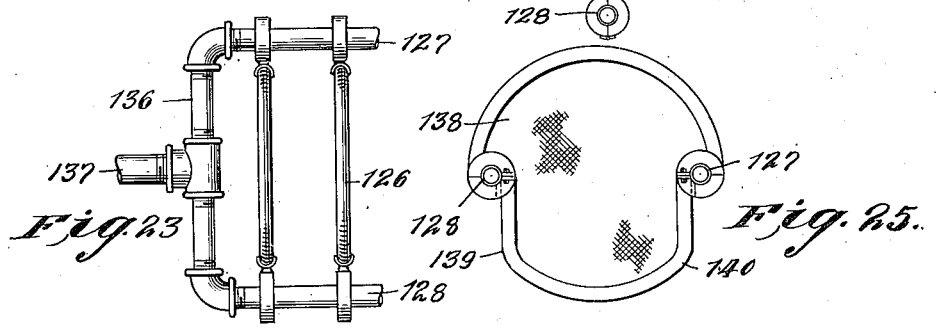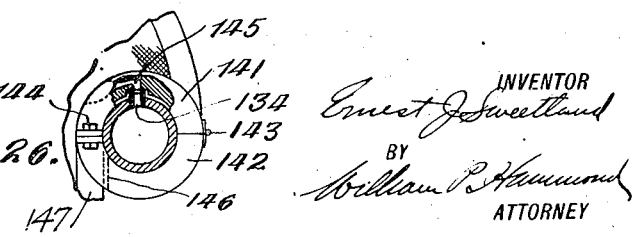

Patented Oct. 7, 1924.

1,510,568

UNITED STATES PATENT OFFICE.

ERNEST J. SWEETLAND, OF MONTCLAIR, NEW JERSEY, ASSIGNOR TO UNITED FILTERS CORPORATION, OF NEW YORK, N. Y., A CORPORATION OF DELAWARE.

FILTER.

Original application filed February 2, 1917, Serial No. 146,056. Divided and this application filed January 14, 1919. Serial No. 271,009.

*To all whom it may concern:*

Be it known that I, ERNEST J. SWEETLAND, a citizen of the United States, residing in the town of Montclair, county of Essex, and State of New Jersey, have invented certain new and useful Improvements in Filters, of which the following is a specification.

My invention relates broadly to filters of the pressure type, that is filters in which the material to be filtered is introduced into a closed compartment under pressure and finds its way out by passing through filter cloth or other filter material, upon which the solids are deposited in the form of filter cake, while the clear liquid or filtrate is led away. Certain features of my invention are particularly applicable to a type of filter in which the filter elements or filter leaves are adapted to be moved relatively to the casing or containing tank, preferably by being mounted upon a central rotatable shaft which at once furnishes their support and also may act as a passage for the filtrate entering the leaves. My invention also aims to provide in filters of this rotary type an improved method of sluicing in which a stream of wash water, steam, or other cleansing agent is caused to travel across the face of the rotating leaf, preferably by automatic means, insuring the ready dislodgment of the filter cake adhering to the surface of the leaf.

I also provide certain improved features of construction for the container of pressure filters, such for instance as the hinge connecting the sections of the casing, and I supply improved means for journaling the central shaft or pipe upon which the filters of a rotary leaf type of filter are mounted in passing through the ends of the casing, so as to avoid to the greatest possible extent breakdown of the parts through wear while insuring a tight joint between the shaft or central pipe and the section of the casing through which it passes to the outside of the filter. I also provide improved means for testing the output of any individual leaf of a filter of the centrally-supported leaf type while the filter is in operation and without substantial interference with the operation of the other leaves. Certain other features of the invention will become apparent in the course of the appended description.

This application is a division of my co-pending application for filters, Serial No. 146,056, filed February 2, 1917.

In the accompanying drawings which form a part of this application—

Figure 1 is a side elevation, the parts being shown in central section for the purpose of clearness, of a filter embodying certain features of my invention.

Figure 2 is an end elevation looking at the left-hand end of the filter of Figure 1.

Figure 3 is a fragmentary detail view, parts being shown in section, of a special type of hinge adapted for use with this filter and the section of the casing in which it is mounted.

Figure 4 is a vertical central sectional view of the type of filter illustrated in Figure 1, but showing a different form of leaf construction, the view being taken on a line corresponding to line IV—IV of Figure 2.

Figure 5 is a transverse sectional view on line V—V of Figure 4.

Figure 6 is a transverse sectional view on line VI—VI of Figure 4.

Figure 7 is an elevation of the filter leaf shown in Figure 1.

Figure 8 is an enlarged side view of the same leaf, parts being shown in transverse central section.

Figure 9 is a sectional view through the central plane of the leaf of Figure 8.

Figure 10 is a side elevation of a portion of a leaf and the supporting pipe, a portion of the pipe being shown in central position.

Figure 11 is a detail view on an enlarged scale of a portion of the filter showing the filter leaves and sluicing pipes together with associated parts.

Figure 12 is a transverse sectional view on line XII—XII of Figure 11.

Figure 13 is a detail view on an enlarged scale on line XIII—XIII of Figure 12.

Figure 14 is a fragmentary top view of a modified form of sluicing nozzle, and

Figure 15 is a sectional view of the same nozzle on line XV—XV of Figure 14.

Figure 16 is a central longitudinal section through a portion of the filter showing a device for testing the filtrate emerging from any one of the filter leaves.

Figure 17 is a side elevation of the tester.

Figure 18 is an end view of the device of Figure 17.

Figure 19 is an end view of a modified type of filter construction.

Figure 20 is a sectional view on line XX—XX of Figure 19.

Figure 21 is a plan view of a further modification.

Figures 22 and 23 are end and side views of a further modification, of which Figure 24 is a fragmentary sectional view on an enlarged scale.

Figure 25 shows a still different type of construction, and

Figure 26 is a fragmentary sectional view of the connection between the leaf and the drainage pipe.

Referring to the drawings in detail, the numeral 1 designates posts or standards adapted to support the upper semi-cylindrical member 2 of the filter. The filter casing is completed by a lower semi-cylindrical member 3 which is preferably attached to the upper section along one side by means of a plurality of hinges 4. One leaf of each hinge is permanently secured to the lower section of the casing, as by means of the bolts 5, and is provided with an upwardly extending lug or boss centrally drilled for the reception of the pintle 6. The other leaf 7 of each hinge is adjustably secured to the upper section of the casing, preferably by means of an integral threaded stud 8 passing through a lug 9 and having its upper end 10 provided with a suitable nut 11, by which the stud and pintle may be vertically adjusted. This construction makes it possible to raise and lower the axis of the pintle of the hinge as may be necessary owing to wear in the gasket (not shown) which provides a water-tight seal between the upper and the lower sections of the casing when they are clamped in operative position.

Along the opposite side of the filter is disposed a plurality of swing bolts 12 attached to a cam shaft 13 and having their lower extremities provided with nuts 14 and washers 15 adapted to engage lugs 16 projecting from the side of the lower section of the casing. A handle 17 is provided for turning the shaft 13 and thereby operating the swing bolts. The construction of the swing bolts and the cam shaft upon which they are mounted, by means of which the bolts automatically are moved longitudinally and then are swung out of engagement with the lugs 16 by the rotation of the shaft, is described and claimed in my United States Patent No. 1,083,305 and will not be here set forth in detail, as they form no part of my present invention. It will suffice to say that the turning of the handle 17 in the direction of the arrow in Fig. 2 first moves the bolts vertically downward until they are free from the lugs 16; and that further rotation of the handle then swings them to the right, out of engagement with the lugs, thus releasing that edge of the lower section of the casing from the upper section of the casing, except for an auxiliary clamp (see Fig. 1) consisting of links 18 pivotally secured at 19 to a lug 20 which may be integral with the upper section of the casing. The lower ends of the links are pivotally connected to a lever 21 provided at one end with a handle 22 and at the other with a locking arm 23 adapted to engage under the lower edge of the lug 20, as shown in Fig. 1, and thus clamp the upper and lower sections of the casing firmly together when the handle of the lever is pushed inwardly toward the filter body. To prevent the sudden dropping of the lower section of the casing when the swing bolts and locking device just described are released, I may provide the lower section of the casing with a counter-weight 24 mounted upon a curved arm 25 secured to the lower section of the casing in any suitable manner, as by means of bolts 26. This counter-weight is so proportioned that it just balances the weight of the lower section of the casing. The latter may thus be readily swung around the axis of the pintle 6 of the hinges either by hand or by other power means until it assumes a substantially vertical position. As stated above, suitable gaskets (not shown) are provided for maintaining a fluid-tight joint between the abutting edges of the upper and lower sections of the casing.

Centrally arranged with reference to the two filter sections is a longitudinal pipe or conduit 27 which is journaled at each end in suitable bearings 28, carried by the posts 1, the details of these bearings being shown in Figs. 1 and 4. The section of the pipe which passes through the casing is surrounded by a collar 28 which is provided at its inner end with a stuffing box 29 including the packing 30 arranged in the usual manner so as to prevent leakage of liquid from the interior of the casing, into which it is introduced under pressure, past the pipe to the outside. This collar is mounted between the flange 31 and the curved seat 32 of the upper section of the casing, to which the flange 31 is bolted (see Fig. 2). A collar 33, secured to the exterior of the pipe 27 in any suitable manner, as by means of the set screw 34, is positioned at the outer flush surfaces of the flange 31, seat 32, and collar 28, and thereby maintains the pipe 27 in proper axial position during its periods of rotation and of rest by preventing its movement longitudinally. A circular strip of packing 35 is mounted in a groove in the outer surface of the collar 28 between its stuffing box and the collar 33 in such position as to seat against the portion 36 of the lower section of the casing, which is curved to fit and which contacts with the lower half of the collar 28 when the lower section of the casing is in normal operative position. Means for oiling the bearing may be provided by an oil cup 37 or other suitable means leading through the seat 32 and the collar 28. It will be seen that by this construction an absolutely fluid-tight joint may be formed between the lower movable part of the casing, the fixed upper section of the casing, and the rotatable shaft or pipe, at the point where the latter pierces the casing, since seepage of fluid between the collar 28 and the pipe is prevented by the packing 30 of the stuffing box 29, while leakage along the outside of the collar 28 is prevented by the packing 35 which contacts both with the upper section of the casing and with the lower section of the casing. At the same time there is no tendency to abrade the packing 35, since the collar 28 is stationary within the casing and does not move with the pipe 27. Consequently there is no wear between it and the lower section at 36, save simply that of compression when the lower section is clamped in place.

In the filter shown in Fig. 1 the central pipe 27 is provided with a plurality of filter leaves 38, illustrated in detail in Figs. 7 to 10, inclusive. Each of these filter leaves consists of a plurality of substantially semi-circular sections 39, 40, joined at the end of a diameter by a hinge 41 and at the other by a suitable latch 42. Each half is preferably provided with a central drainage member 43 preferably formed of heavy screen, on each side of which is a layer of filter cloth 44, the cloth and the screen being clamped together by means of a peripheral ring 45 of U-shaped section. The flat edge of each half leaf is provided with a binding strip 46 of similar U-section, to which is attached a central fitting 47 formed for engagement with the outside of the pipe 27 and having a recess 48 for the reception of a nipple 49 leading from the interior of the pipe 27 and projecting a short distance beyond the surface of the pipe 27. A circular gasket 50 is provided adjacent to the outer end of each of the nipples 49, so that when the filter leaf is clamped in place a fluid-tight joint is thus effected between the interior of the pipe 49 and the passage 51 which leads to the drainage area formed by the drainage member 43.

When the fluid to be filtered is introduced into the interior of the filter casing, as through the inlet manifold 52 (see Fig. 2), the only outlet for such liquid is through the cloth 44 of the filter leaves into the interior or drainage area of each leaf formed by the member 43. Thence the clear filtrate flows through the passage 51 and pipe 49, into the pipe 27. The gaskets 50 prevent any of the liquid from seeping between the exterior of the pipe 27 and the interior of the fitting 47, and thus through the pipe 49 into the pipe 27. Consequently only the filtered liquid reaches the pipe 27. From the pipe 27 the filtrate is discharged into any suitable receptable. The solid matter originally held in suspension in the liquid to be filtered cannot pass through the cloth 44, and is deposited on the outer surface of each leaf in the form of a layer of solid matter, which is known as the filter cake.

An alternative form of leaf construction is shown in Figs. 4, 5 and 6 in which each leaf 53, as before, may consist of a central drainage section formed of screen, covered by filter fabric, but each leaf has a continuous peripheral binding edge, so that it is integral and self contained. At the center the leaf is provided with a circular opening entirely through it and just large enough to receive the pipe 27 at its central portion, which is of slightly larger diameter than the end portions which pass through the bearings in the casing. On each side of each leaf is an annular gasket 54 having inwardly projecting tabs 54$^a$ engaging the outer surface of the pipe 27 and thus positioning the gasket upon it while suitably spacing it from the pipe. Adjacent to the other face of each gasket is a separator or spacing collar 55 having substantially the same cross-section as the gasket, but formed of rigid material, such as metal. The gaskets and associated collars together form an annular drainage channel 56 between each pair of leaves. A plurality of suitable apertures 57 are provided in the pipe 27. It will thus be seen that liquid reaching the interior of the filter leaf will be discharged into the drainage channel 56 between the outer surface of the pipe 27 and the collars and gaskets, and will then pass into the pipe through the apertures 57. The entire assembly is clamped in the pipe by means of collars 58 and 59 having internal threads adapted to engage threads (not shown) formed on the outer surface of the pipe at that point. Gaskets 59$^a$ may be provided for insuring a liquid-tight joint between the end or terminal filter leaves and the threaded collars.

To wash the surfaces of the filter leaves when it is desired to free them from the deposit of filter cake that may be formed on them, I provide the structure which is shown in detail in Figs. 2 and 11 to 15, inclusive. A sluicing manifold 60 passes through suitable stuffing boxes 61 at each end of the casing and is provided with sluicing pipes 62 preferably entering between each pair of filter leaves. These sluicing pipes may be provided with any preferred form of orifice for the discharge of water, compressed air, steam, or other cleansing fluid, but I prefer to provide the end of each pipe with a nozzle 63, as shown in detail in Figs. 12 and 13. Each nozzle preferably consists of a fitting suitably secured to the end of the pipe 62, as by being screwed thereon, and having a central passage 64 at right angles to the bore of the pipe 62. The ends of the fitting are preferably inclined as shown and are protected by some suitable form of valve, such as a strip 65 of thin resilient material such as spring steel, secured at one edge 66 to the fitting. When fluid under pressure is admitted to the pipe 62 it passes through it to the bore 64 of the nozzle, and readily pushing aside the valves 65, impinges upon the adjacent surface of a filter leaf in a flat cutting stream which is substantially parallel to the surface of the filter leaf. At times when no wash water or other fluid is introduced into the sluicing pipes, the flap valves 65 close the orifices of the nozzles and prevent solid matter in suspension in the liquid in the casing from backing up into the nozzles and clogging them and the pipes through which they are fed. In the filtration of many materials, such as sugar refinery liquors, which contain a considerable amount of foreign matter in suspension, especially fibrous substances, the liquor backs up into the sluicing pipe during the periods when filtration is in progress, and often clogs up the nozzle. It will be seen that with the construction just described no sludge or liquid containing matter in suspension can enter the nozzle or the sluicing pipe, and the greater the pressure under which the sludge is pumped into the filter, the greater the force causing the valve 65 to seat tightly against the orifice of the nozzle fitting 64. An alternative form of nozzle construction is shown in Figs. 14 and 15. In this type I propose to form the nozzle of an integral molded cap 67 of rubber or other suitable material which may be slipped over the outer end of the pipe 62 and may be held thereon by any suitable constrictive means such as wire 68, the ends of which may be twisted together as shown. The outer end of the cap is provided with an annular slit 69 which does not quite sever the end of the cap from the body of it, but which leaves an integral tongue 70 connecting the end of the cap with the body portion, thus forming a flap 71 corresponding in its function to the flap 65 already described. This construction even more effectually prevents backing up of solid-laden liquid into the nozzle, since there is a rubber-to-rubber joint between the flap and the body of the nozzle.

In order to cause the nozzle of each of the sluicing pipes to sweep across the surface of the filter leaves as the latter revolve within the casing, the manifold 60 is made rotatable within its stuffing box supports, and the means illustrated in Figures 1 and 2 are provided for automatically causing it to oscillate. These means include a gear 72 mounted upon and moving with the pipe 27. This gear meshes with one of the idlers 73, the second of which drives the gear 74 keyed to the shaft 75 carrying a cam 76. This cam engages a cam follower 77 which is secured to the manifold 60 and drives it. The follower is also provided with an extending arm 78 to which is connected a spring 79 fixed at its other end to a standard 80. This spring acts to keep the follower constantly in engagement with the surface of the cam and to overcome any friction in the stuffing boxes. The cam is so designed as to cause a slow advance of the nozzle from the position of Fig. 12 down across the face of the filter leaves, and then to produce a relatively quick return back to the initial position. It will be appreciated that the sluicing pipes do not cross the central pipe 27 but play across only half of the face of each leaf, but this is sufficient since the leaves themselves are meanwhile rotated.

In Figs. 16, 17 and 18 I have illustrated a device for sampling the effluent filtrate from any individual leaf without halting the process of filtration or interrupting the efficient operation of the other leaves. In some pressure filters having leaves as the filter elements, this effect is accomplished by having the filtrate from each individual leaf pass into an outlet manifold through an individual drain pipe, a portion of which is composed of glass. Such construction is shown in my United States Reissue Letters Patent No. 14,213. However, with filters of the rotating leaf type, this plan is obviously impracticable and some other means such as that here illustrated must be used for determining the performance of the various leaves. It will be appreciated that in the process of filtration, one of the leaves may fail, thus causing the filtrate flowing from the machine to become charged with solids that have entered the filtrate manifold through the leaf which has broken down, or it may be that one of the leaves has become clogged so as to prevent efficient filtration by it. For these reasons it is highly desirable to be able to test at any time the filtrate issuing from any leaf.

In the type of device illustrated in the drawings a spool-shaped member 100 having a cupped outer surface 101 and preferably composed of rubber or other somewhat flexible resilient material, is adapted to be introduced into the central drainage pipe 27. This member is mounted on and supported by a pipe 102, opening at each end into the annular space bounded by the cup-shaped surface referred to and the adjacent portion of the inner wall of the pipe 27. Another pipe 103, which acts both as a handle for the device and also as a drainage tube, is secured to the pipe 102 and opens into it, being disposed so as to be longitudinally arranged with reference to the drainage member 27 when the device is inserted therein. In practice, the member 100 is inserted into the drainage member 27 until the cup-shaped member spans the drainage zone of any one leaf. For instance, in Fig. 16 the device is in position to sample the filtrate flowing from leaf 104. The lips of the cup-shaped member 100 contact sufficiently tightly with the inner surface of the wall of the drainage member 27 to prevent seepage of the effluent filtrate from the leaf 104 past the lips or edges of the member 100, so that the only outlet for this filtrate is through the pipe 102 and so on out through the pipe 103, which is made long enough to project beyond the open end of the pipe 27, where it extends beyond the casing of the filter. It will thus be seen that by the use of this device the effluent filtrate from any leaf may be led separately out of the filter into a receptacle for observation or testing. In order that the operator may be able to aline the pipe 102 with sufficient accuracy with the drainage nipples of the various filter leaves, the outer extending end 105 of the pipe 103 may be provided with designating marks 106 such that when any mark is placed in alinement with the end of the pipe 27, or with any other predetermined fixed point on the filter body, the spool-shaped member 100 will then be in proper position to draw the filtrate from the filter leaf whose number corresponds with that on the indicia 106. It will be observed that the pipe 102 and member 100 do not block the interior of pipe 27 to such an extent as to prevent the ready flow of filtrate from other filter leaves past them and so on out of the filter in the normal way.

In Figures 19 and 20 I have illustrated a type of filter in which the leaves 120 are adapted to be mounted upon the center drainage pipe 121. At suitable points about the periphery on the leaf are mounted laterally extending cup-shaped members 122, which are rigidly secured to the leaf in any suitable manner. In the filtration of many gummy or stickly substances, such as syrup, gelatine, glucose, varnish, and the like, I find it desirable to mix with the substance to be filtered some insoluble granular material, such as sand. This may either be used alone or in connection with kieselguhr, and has two purposes, first, to make it possible to use a fairly coarse metallic filter medium, and second, to cause the production of a granular filter cake instead of a more compact slimy filter cake. However, when sand or the like is so used, it tends to settle rapidly to the bottom and will not remain in suspension in the sludge, unless some suitable means is provided for agitating it. In filters of the rotary type, this agitation may be produced by the cups or paddles 122 attached to the filter leaves. Not only will the rotation of the leaf produce the agitation of the sludge or liquid being filtered, but the sand which is actually caught and retained in the cup upon its upward travel, will be discharged as the cup reaches the topmost part of the leaf, and it will thus be distributed over the face of the leaf in a position to do the most good.

Figure 21 illustrates a modified form of agitator in which the filter leaves 120 are connected by blades or paddles 123 which are preferably bolted to the end or terminal leaves and which are cut away at 124 to admit the edges of the intermediate leaves, which they thereby support in a direction perpendicular to their surface and thus hold the leaves in proper spaced relation. The outer edges of the paddles 123 are preferably provided with extending strips 125 of rubber or other suitable flexible fabric. These strips are adapted to sweep along the inside of the filter casing as the leaves revolve, such as the rubber strips on a revolving door contact with the casing in which the door is set. It will be appreciated that the casting which forms the casing is frequently not truly circular, but presents small inequalities in the surface. The rubber strips accommodate themselves to these inequalities and insure a continuous contact between the paddles of which they form a part, and the casing. Like the cups 122, the paddles are well adapted to agitate the liquid being filtered and through this agitation and the actual scraping of the casing, keep the sand from settling permanently at the bottom.

Figures 22, 23 and 24 show a modified type of construction in which the filter leaves 126 are supported upon lateral drainage pipes 127 and 128 upon which they are mounted by a fitting consisting of a section 129 secured to the leaf, and a section 130 hinged to the section 129 at 131. The free end of the section 130 is adapted to be clamped to the section 129 in any suitable way, as by means of the bolts 132, thereby firmly clamping the leaf to the pipe. The section 129 is provided with a drainage channel 133 communicating at one end with the interior of the leaf, and at the other end with a nipple 134 entering the drainage pipe. A gasket 135 may be used for insuring a water tight joint between the nipple and the drainage channel. At each end the pipes 127 and 128 are led to a header 136 connecting with a pipe 137, which is rotatably mounted in the casing in the same manner as are the center drainage pipes previously described. In removing the leaf from the drainage pipes, it is merely necessary to loosen the bolts 132 and to swing back the clamp sections 130, whereupon the leaf will be freed from the pipes.

In order to attain the advantages of the lateral supporting leaf and still attain the maximum drainage area, I may form a leaf as shown in Figures 25 and 26, in which the greater part of the leaf 138 in formed of a diameter just sufficient to be received in the casing. The leaf is cut away at 139 and 140 so that it may be slipped laterally over the drainage pipes 127 and 128. Suitable clamps are provided for securing the leaf to the pipes, each clamp consisting of a section 141 secured to the leaf and a section 142 hinged to the other section at 143, and having its free end detachably bolted to it at 144. The drainage channel 145 leads from the interior of the leaf to the nipple 134. The free end of the section 142 is forked at 146, so as to span the adjacent part of the binding strip 147.

While I have illustrated and described only certain specific embodiments of my invention, I realize that it is susceptible of wide adaptation and I do not desire to be limited to the precise construction shown and described nor to the application of certain of the features of my invention to filters of the rotary type, since they are equally applicable to many well-known types of filters.

Having thus disclosed my invention, I claim:—

1. In a pressure filter, a closed casing, a rotatable drainage pipe mounted in said casing, a plurality of separable filter leaves mounted on said pipe, spacing members located between the leaves and spaced from the pipe, and compressible means spaced from the pipe and adapted to form a fluid-tight joint between the leaves and the spacing members, the leaves and spacing members being slidable with reference to the pipe, and means for applying compression to an assembly of leaves, spacing members and compressible means, for locking them on the pipe.

2. In a pressure filter, a closed casing, a rotatable drainage pipe mounted in said casing, a plurality of separable filter leaves mounted on said pipe, spacing members located between the leaves and spaced from the pipe, and compressible means spaced from the pipe and adapted to form a fluid-tight joint between the leaves and the spacing members, the leaves and spacing members being slidable with reference to the pipe, a stop near one end of the pipe within the casing, and a clamp near the other end of the pipe within the casing, for applying compression to an assembly of leaves, spacing members and compressible means, for locking them on the pipe.

3. In a pressure filter, a closed casing, a rotatable drainage pipe mounted in said casing, a plurality of separable filter leaves mounted on said pipe, spacing members located between the leaves and spaced from the pipe, and compressible means spaced from the pipe and adapted to form a fluid-tight joint between the leaves and the spacing members, the leaves and spacing members being slidable with reference to the pipe, and a plurality of stops adjustably disposed on said pipe for engaging the terminal leaves of an assembly of leaves, spacing members and compressible means, for clamping the same to the pipe but spaced transversely therefrom.

4. In a filter, a casing, a filter element rotatably mounted therein, and automatic means for moving a flat stream of cleansing fluid across the face of said element and in a substantially parallel plane thereto while the element is in motion.

5. In a filter, a casing, a filter element rotatably mounted therein, and automatic means for moving a flat stream of cleansing fluid across the face of said element in a plane substantially parallel thereto while the element is in motion and at a rate of speed proportionate to the speed of said element.

6. In a filter, a casing, a filter element rotatably mounted therein, automatic means for moving a flat stream of cleansing fluid across the face of said element and substantially parallel thereto while the element is in motion, and means for returning said stream to its initial position.

7. In a filter, a casing, a filter element rotatably mounted therein, means for moving a flat stream of cleansing fluid across the face of said element and substantially parallel thereto while the element is in motion and at a rate of speed proportionate to the speed of said element and means for returning said stream to its initial position.

8. In a filter, a casing, a filter element rotatably mounted therein, means for moving a flat stream of cleansing fluid across the face of said element and substantially parallel thereto while the element is in motion and at a rate of speed proportionate to the speed of said element and means for returning said stream to its initial position at a greater relative speed.

9. In a filter, a casing, a filter element movably mounted therein, a sluicing device movably mounted within the casing, a slow-advance and quick-return device for actuating said sluicing device, and means connecting the said actuating device with the filter element for causing the same to operate in unison.

10. In a filter, a casing, a filter element movably mounted therein, a sluicing device movably mounted in said casing, a cam for actuating said sluicing device, to produce a separating action between the said filter element and material deposited thereon, and means for driving said cam from said filter element.

11. In a filter, a casing, a filter element movably mounted therein, a sluicing device movably mounted within the casing, a follower interposed between said cam and said sluicing device, said cam being adapted to transmit a slow-advance and quick-return motion to said follower, and means for driving said cam in unison with said filter element.

12. In a filter, a casing, a filter element movably mounted therein, a sluicing device movably mounted within the casing, a cam, a follower interposed between said cam and said sluicing device, said cam being adapted to transmit a slow-advance and quick-return motion to said follower, and gearing connecting said cam with said filter element.

ERNEST J. SWEETLAND.